United States Patent [19]
d'Alayer de Costemore d'Arc

[11] Patent Number: 5,465,246
[45] Date of Patent: Nov. 7, 1995

[54] DEVICE INSURING SAFE INSERTION OF CARTRIDGES INTO LOADING APPARATUS OF PLAYBACK AND/OR RECORDING UNITS

[75] Inventor: Stephane M. A. d'Alayer de Costemore d'Arc, Genappe, Belgium

[73] Assignee: Staar S.A., Brussels, Belgium

[21] Appl. No.: 231,830

[22] Filed: Apr. 25, 1994

[30] Foreign Application Priority Data

May 12, 1993 [BE] Belgium ................................ 9300491

[51] Int. Cl.$^6$ ............................. G11B 17/04; G11B 33/02
[52] U.S. Cl. ...................... 369/77.2; 369/291; 360/99.06
[58] Field of Search ................... 369/77.1, 77.2, 369/291; 360/99.06, 99.02, 92, 93, 96.1, 96.5, 96.6, 96.1

[56] References Cited

U.S. PATENT DOCUMENTS

| | | | |
|---|---|---|---|
| 4,546,396 | 10/1985 | Schatterman | 360/96.5 |
| 5,022,023 | 6/1991 | Toyoguchi | 369/77.1 |
| 5,063,554 | 11/1991 | Uehara | 369/77.2 |
| 5,088,085 | 2/1992 | Uehara | 360/99.06 |
| 5,151,835 | 9/1992 | Nakanishi | 360/96.5 |
| 5,164,935 | 11/1992 | Shimegi et al. | 369/77.2 |
| 5,297,117 | 3/1994 | Uzuki et al. | 369/77.2 |

FOREIGN PATENT DOCUMENTS

| | | |
|---|---|---|
| 392595 | 4/1990 | European Pat. Off. . |
| 47-36088 | 11/1972 | Japan . |
| 50-34516 | 4/1975 | Japan . |

*Primary Examiner*—Stuart S. Levy
*Assistant Examiner*—Paul J. Ditmyer
*Attorney, Agent, or Firm*—Leydig, Voit & Mayer

[57] ABSTRACT

A blocking device for insuring that the insertion movement of a cartridge is impeded immediately if the cartridge is not properly oriented when inserted by the user in loading apparatus for flat, rectangular cartridges with a casing having longer longitudinal edges than transverse edges parallel top and bottom faces, and transverse-edge grooves that are asymmetrical relative to the parallel faces. The apparatus has an entrance through which a cartridge when properly oriented is inserted front-edge first in a direction perpendicular thereto. The blocking device includes a pair of movable blocking elements which are mirror images of each other and are symmetrically mounted straddling the center line of the entrance and resiliently urged toward each other, each blocking elements presenting (i) a stop member near the center line which extends vertically into the path of the cartridge to impede its insertion and which is carried on a flexible portion of the blocking element that can flex to retract the stop member clear of the cartridge to allow insertion, (ii) a lateral surface near a side margin of the entrance which is engaged by a corner of the front-edge of the cartridge to move the respective blocking element laterally and away from the other blocking element as the cartridge starts through the entrance, and (iii) a laterally extending tongue near the entrance side margin which enters the transverse-edge groove of the respective cartridge when the cartridge is top-face up when inserted; the blocking device further includes a pair of displacement members mounted near the center line coacting with the blocking elements to flex the flexible portions thereof and retract the stop members responsive to lateral movement of both blocking elements produced by engagement of the lateral surfaces thereof by both corners of the front-edge of the cartridge, thereby to allow the cartridge through the entrance only when the cartridge is properly oriented when inserted.

13 Claims, 3 Drawing Sheets

DEVICE INSURING SAFE INSERTION OF CARTRIDGES INTO LOADING APPARATUS OF PLAYBACK AND/OR RECORDING UNITS

The present invention relates to loading apparatus for cassettes, cartridges and casings for data media such as discs, magnetic tapes, etc, (hereinafter "cartridges" or "cartridge") and, more particularly, to devices preventing or impeding, at the very start of the insertion movement, the insertion of a cartridge which is not properly oriented when inserted.

BACKGROUND

There are known devices for preventing insertion into loading apparatus of an incorrectly oriented cartridge, but many of such devices are not operative whether a cartridge is inserted longitudinally (front-edge first) or laterally (side-edge first). Also, they typically require the cartridge to be inserted to nearly or over half the full insertion distance in order to be operative. For example, Japanese documents 50-34516 and 47-36088 show devices for a Compact Cassette which detect the increased thickness of the cassette on the edge of one of its faces. Such detection does not occur until the cassette has been inserted to almost 80% of the insertion distance. The drawback of such devices is that the user, having inserted the cartridge as far as it will go, is convinced that it is positioned correctly and, therefore, tries to continue the insertion movement by exerting greater force, with the risk of damaging the cartridge, the tray receiving the cartridge, and/or the loading apparatus.

U.S. Pat. No. 5,022,023 proposes a disc reader device provided with mechanical sensors determining whether the disc inserted by the user has a small or large diameter, and releasing or not releasing guide pieces in accordance with this determination. If applied to cartridges, such a device could be used for positioning cartridges of different sizes, but would not be capable of detecting whether the cartridges were correctly oriented.

SUMMARY OF THE INVENTION

It is, therefore, an object of the present invention to remedy the aforesaid disadvantages by providing a simple, effective, economical and reliable device for insuring that the insertion movement of a cartridge is impeded immediately if the cartridge is not properly oriented when inserted by the user.

Another object of the invention is to insure that this detection occurs at the very start of the insertion movement of the cartridge.

The invention is applied to a blocking device in loading apparatus for flat, rectangular cartridges with a casing having longer longitudinal edges than transverse edges, parallel top and bottom faces, and transverse-edge grooves that are asymmetrical relative to the parallel faces, the apparatus having an entrance through which a cartridge when properly oriented is inserted front-edge first in a direction perpendicular thereto; the blocking device includes a pair of movable blocking elements which are mirror images of each other and are symmetrically mounted straddling the center line of the entrance and resiliently urged toward each other, each blocking element presenting (i) a stop member near the center line which extends vertically into the path of the cartridge to impede its insertion and which is carried on a flexible portion of the blocking element that can flex to retract the stop member clear of the cartridge to allow insertion, (ii) a lateral surface near a side margin of the entrance which is engaged by a corner of the front-edge of the cartridge to move the respective blocking element laterally and away from the other blocking element as the cartridge starts through the entrance, and (iii) a laterally extending tongue near the entrance side margin which enters the transverse-edge groove of the respective cartridge when the cartridge is top-face up when inserted; the blocking device further having a pair of displacement members mounted near the center line coacting with the blocking elements to flex the flexible portions thereof and retract the stop members responsive to lateral movement of both blocking elements produced by engagement of the lateral surfaces thereof by both corners of the front-edge of the cartridge, thereby to allow the cartridge through the entrance only when the cartridge is properly oriented when inserted.

Other advantages and features will appear from the description given below of the preferred embodiment of the invention, which may be modified without departing from the scope of the invention, in which:

DESCRIPTION OF THE BEST MODE

Figure 5A:
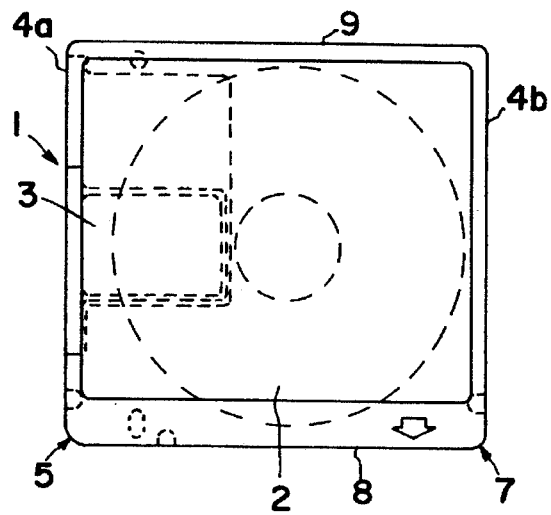
FIGS. 5a, 5b and 5c show diagrammatic top, end and side views, respectively of a cartridge to be inserted into the apparatus of FIGS. 1–4.
Figure 5C:
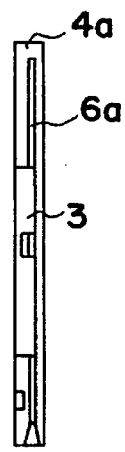
Figure 5B:
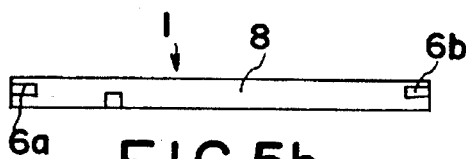

As shown in FIGS. 5a–5c, to explain the preferred embodiment of the invention the cartridge 1 is a "Mini-Disc" cartridge, that is to say, a cartridge having an essentially flat, rectangular casing with longer longitudinal edges than transverse edges (72×67×5 mm) containing a disc 2 of approximately 64 mm diameter, and fitted with a sliding shutter 3 giving access through one of the parallel faces to the surface of the disc when the cartridge is in the operating position in the loading apparatus. The "front" longitudinal edge 8 of the cartridge has two rounded corners 5 and 7, while the two transverse edges 4a and 4b are each provided with a groove, 6a and 6b, which is unequally distant from the top and bottom faces and, therefore, asymmetric with respect to these faces and which is formed over almost but not quite the whole length of each transverse edge (see FIG. 5c). A tab is provided in all mechanisms accepting this cartridge to enter the groove 6a and open the shutter 3, but only upon completion of the insertion of the cartridge 1, so as to prevent any physical contact from being made with the surface of the disc as long as the disc is not inside the recording and/or playback unit.

Figure 3:
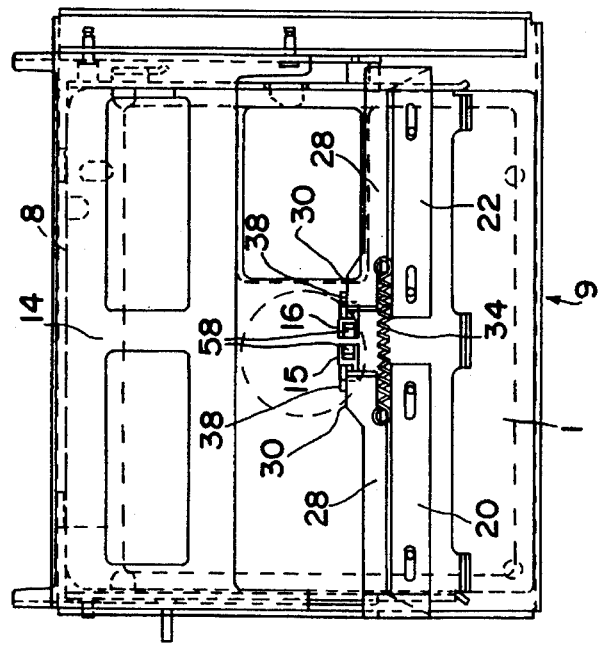
FIGS. 3 and 4 are similar to FIGS. 1 and 2 but with a cartridge properly oriented and placed in the operative position.
Figure 1:
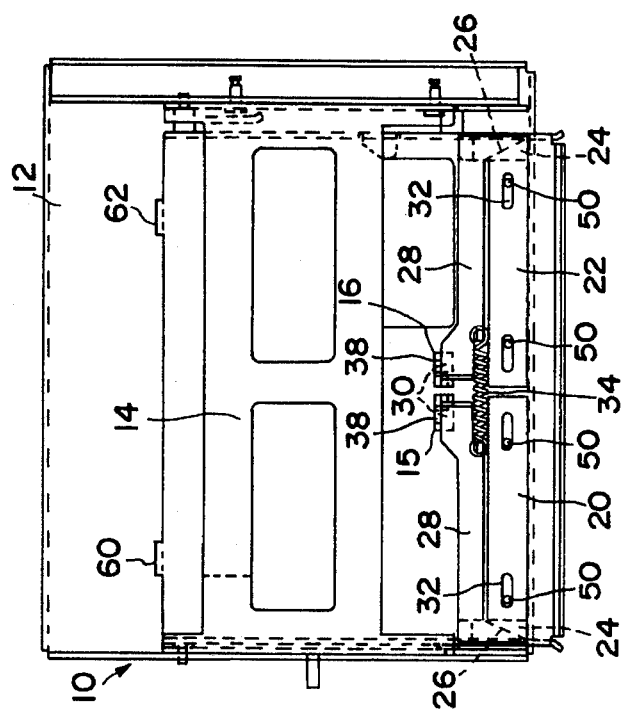
FIG. 1 is a simplified top view of a loading apparatus embodying the invention, with the cartridge absent from the apparatus.
Figure 2:
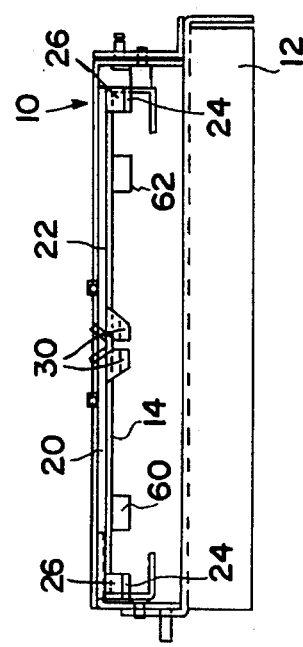
FIG. 2 is an end view of FIG. 1.

As FIG. 1 diagrammatically shows, the loading apparatus 10 for a cartridge and, in particular, for the cartridge shown in FIGS. 5a–5c, principally comprises a frame 12, a tray 14 intended to receive the cartridge 1 and means for transferring the tray 14 and the cartridge which it contains between its raised insertion or ejection position (FIG. 1) and its lowered operating position (FIG. 3). This loading apparatus 10 is the subject of commonly assigned U.S. Pat. No. 4,546,396, to which reference should be made for any additional information regarding the construction and operation of the apparatus.

At its front entrance, the entrance through which the cartridge is inserted into the loading apparatus 10, in accordance with this invention the tray 14 carries two similar blocking elements 20,22 (FIG. 1) which are mirror images of each other, shown as a left-hand element 20 and a right-hand element 22 (viewed from the top as in FIG. 1), which are laterally movable apart from the position shown in FIG. 1 in which they are resiliently biased toward each other by a spring 34.

Figure 4:
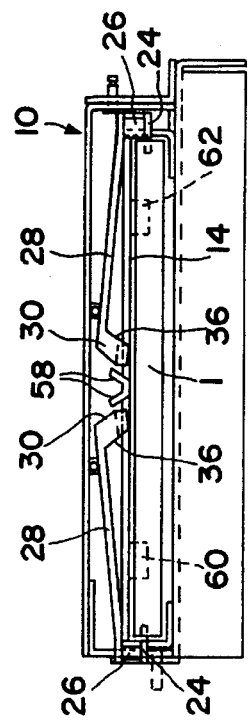
Figure 6:
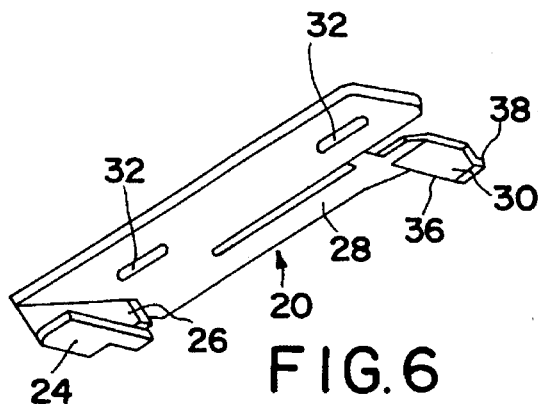
FIG. 6 is a perspective view taken from the bottom of one of the movable blocking elements which impede the insertion of the cartridge when not oriented properly when inserted.

As shown in FIG. 6, which is a bottom perspective view of the left-hand blocking element 20, each blocking element 20,22 presents a laterally extending tongue 24 which is located at the side margin of the entrance and is intended to enter the corresponding groove 6a,6b in the transverse-edge of the cartridge, and a lateral inclined surface 26 which is at the side margin of the entrance and which is engaged by a rounded front corner 5,7 of the cartridge 1. Further in keeping with the invention, each blocking element 20,22 presents a lug 30 which is rearwardly inclined downward so that it projects vertically down into the path of the front edge of the cartridge 1; the lug 30 is carried by a flexible tongue 28 formed by a slit in the member 20,22; the lug 30 serves as a stop member (FIG. 1) when in the blocking position which will be retracted from the path of the cartridge 1 by the cartridge itself when it is properly oriented when inserted, the flexible tongue 28 flexing upwardly as shown in FIG. 4 to retract the lug 30. Each blocking element 20,22 is mounted in the central portion of the tray 14 by means of a combination of studs 50 on the tray 14 and slots 32 in the blocking element 20,22.

The biasing spring 34 holds the two blocking elements 20,22 in a symmetrical arrangement straddling the center line of the entrance to the apparatus and resiliently maintains them close to the center line (FIGS. 1 and 3).

The tray 14 has a notch, defined by lateral displacement edges or members 15,16 (FIGS. 1 and 3), through which the retractable lugs 30 pass into the path of the front edge of the cartridge 1.

The tray 14 has two rear lugs 60,62 fixed to the tray 14 serving as stops against which the front-edge 8 of the cartridge comes into abutment to move the tray horizontally in the course of the cartridge insertion movement.

When a cartridge which is properly oriented is inserted into the tray 14 of the loading apparatus 10, i.e. with the front-edge leading and the top face up, the laterally extending tongues 24 of the elements 20,22 which are located at the side margins of the tray 14 enter the grooves 6a and 6b of the cartridge transverse edges and thus allow insertion of the cartridge. It will be noted that the cartridge 1 which is illustrated has a front-edge 8 with rounded corners and the side grooves 6a and 6b are accessible at the front edge but, because the grooves 6a and 6b do not extend the full length of the transverse edges the grooves are not accessible at the back edge 9 and the tongues 24 cannot enter these grooves should the user attempt to insert the cartridge back-edge first into the entrance; in addition, to facilitate identification of the back-edge edge 9 the corners are not rounded but rather are square. The laterally extending tongues 24 serve as stops to prevent insertion of the cartridge back-edge first, which is an example of a cartridge improperly oriented for insertion.

Further in keeping with the invention, the tray 14 has two folded tabs 58 essentially at the center line which prevent upward movement of each lug 30 unless the corresponding blocking element 20,22 is moved laterally when the cartridge is inserted.

Figure 7A:
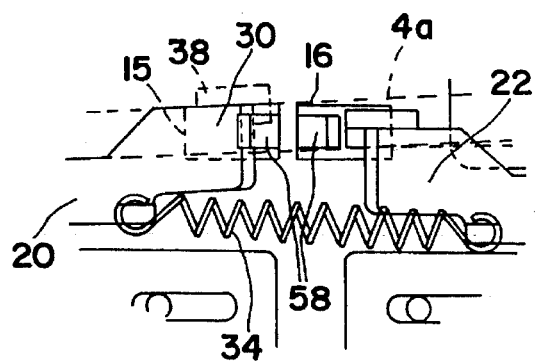
FIG. 7a is a fragmentary enlarged view of the movable blocking elements in the position shown in FIG. 7.
Figure 7:
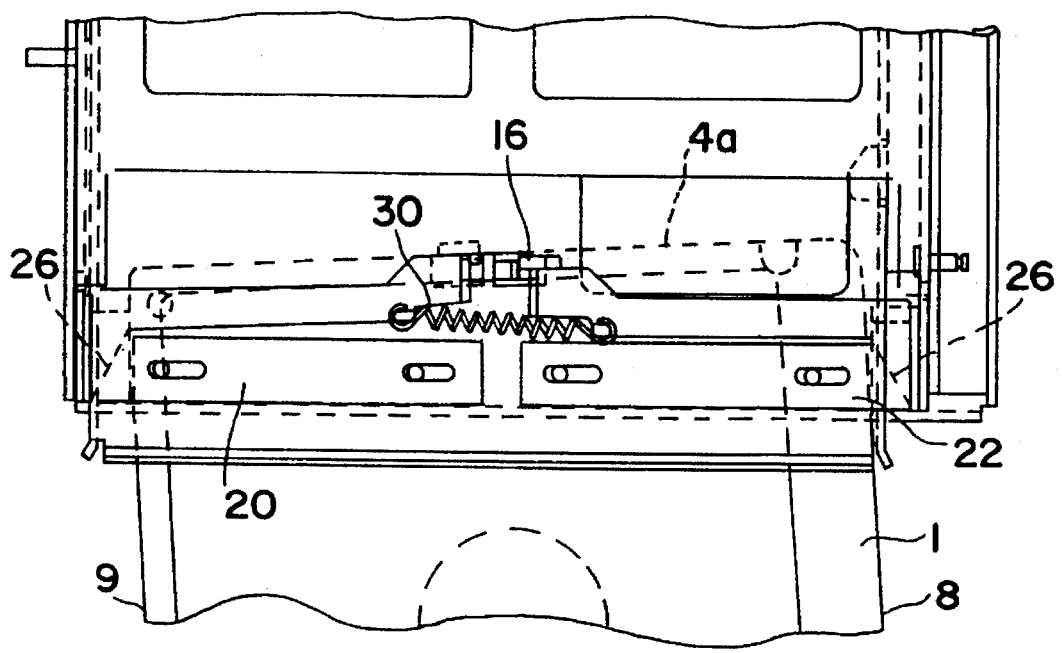
FIG. 7 diagrammatically illustrates the movable blocking elements of the invention impeding insertion of a cartridge as shown in FIGS. 5a–5c when being inserted improperly side-edge first and inclined.

With a cartridge 1 as illustrated which is longer longitudinally than transverse, when the cartridge 1 is inserted front-edge first, both rounded corners 5,7 of the front-edge 8 engage lateral surfaces 26 presented by both blocking elements 20,22 at the opposite side margins of the entrance to the tray 14. If the cartridge 1 is improperly oriented transverse-edge first, particularly when it is inserted in a slanted manner as shown in FIG. 7, since the transverse dimension is shorter than the longitudinal dimension, one of the rounded corners 5,7 may engage the lateral surface 26 presented by the blocking element 20,22, but the lateral surface 26 presented by the other blocking element 20,22 will not be engaged as illustrated in FIG. 7. This is a particularly important advantage of the blocking device of this invention when applied, for example, to loading apparatus of playback and/or recording units installed in vehicles, where the driver and user of the units is required to direct attention to the road and may not be able to divert sufficient attention to loading a cartridge to insure that it is correctly oriented when inserted in the apparatus. In this type of application of the blocking device of this invention, this advantage of preventing insertion of the cartridge if improperly oriented becomes very important since it constitutes a safety feature by improving safety of vehicle operation.

Each of the lateral surfaces 26 presented by the blocking elements 20,22 is inclined horizontally and when both of these lateral surfaces 26 are engaged by the front corners 5,7 of the cartridge 1 the blocking elements 20,22 are urged laterally apart against the biasing action of the return spring 34 (FIG. 3). In keeping with the invention, upon the blocking elements 20,22 being urged apart in this way, the lugs 30 of the blocking elements 20,22 are retracted from the path of the cartridge. To retract the lugs 30, the flexible tongue portions 28 of the blocking elements 20,22 are flexed to raise the lugs 30 upwardly (FIG. 4) and thereby retract the lugs. To cause the flexing action, inclined edges 36 of the lugs 30 engage the displacement edges or members 15,16 defining the notch through which the lugs project as the blocking elements are moved laterally apart.

As shown in FIG. 3 and FIG. 4, the lugs 30 when retracted out of the path of and clear of the cartridge 1 allow full insertion of the cartridge, and the loading apparatus 10 then is operated to raise or lower the cartridge and the drive/pickup mechanisms relatively so that the cartridge is transferred to the operating position.

Should the user attempt to insert the cartridge 1 upside down, because the transverse-edge grooves 6a and 6b are positioned asymmetrically, the laterally extending tongues 24 presented by the blocking elements block insertion of the cartridge.

Should the user attempt to insert the cartridge 1 back-edge first, because the grooves 6a and 6b do not extend completely to the back-edge, the laterally extending tongues 24 block insertion of the cartridge.

Should the user attempt to insert the cartridge 1 transverse-edge 4a or 4b first (FIG. 7), because the width and the relative positions of the laterally extending tongues 24 are preferably such that the gap between them is greater than, or substantially equal to, the length of the transverse edges 4a,4b, even if one of the blocking elements 20,22 were to be shifted (for example the blocking element 22 in FIG. 7 because the user inserted the cartridge 1 at a slant), the other blocking element (22 in FIG. 7) will not be shifted, and consequently its lug 30 will not be retracted and will still block insertion of the cartridge 1.

Furthermore, as herein shown each lug 30 has a horizontally extending finger 38 at the lower rear edge the arm of which is to block upward movement of the lug 30 should the cartridge be inserted laterally (see FIG. 7a) with the cartridge side-edge abutting against the inclined edge 36 of the lug 30, especially if the cartridge is somewhat inclined with respect to the horizontal surface of the tray 14. In such a case the lug 30 rises but is blocked by the under surface behind the notch in the tray 14 defined by the displacement edges 15,16.

Figure 8:
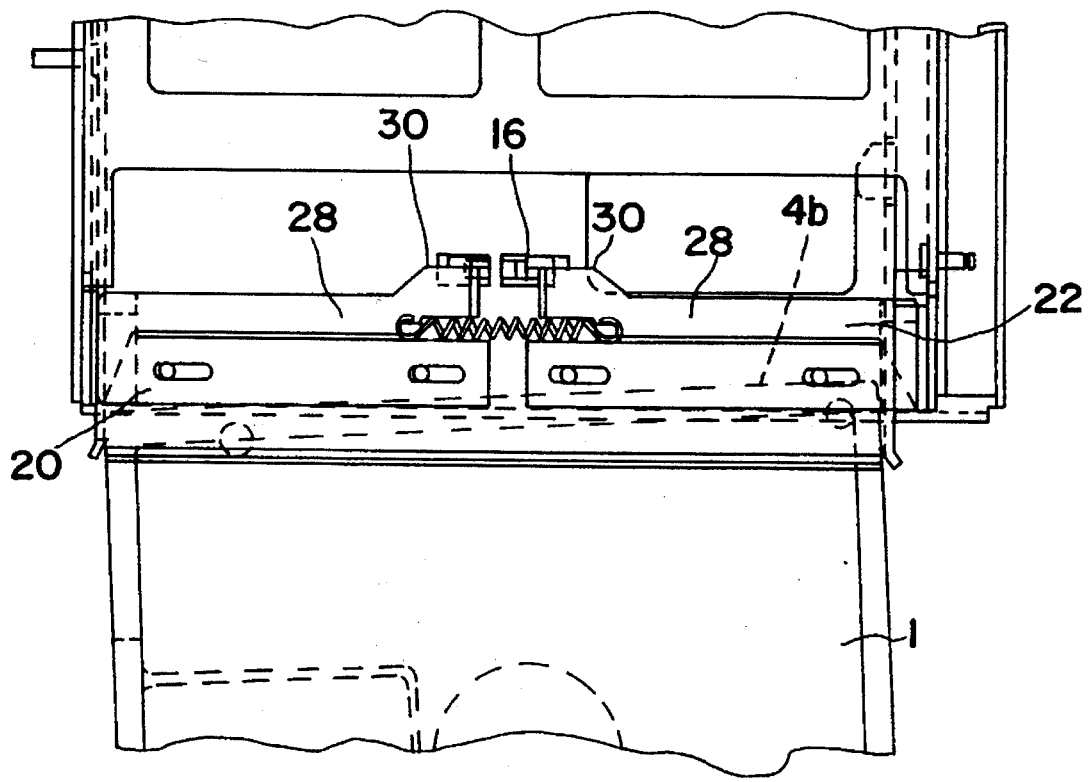
FIG. 8 is a view similar to FIG. 7 where the cartridge is being improperly inserted back-edge first and inclined.

Should the user attempt to insert the cartridge 1 back-edge first or upside down, while inserting it at a slant to effect the lateral movement of one of the blocking elements 20,22 (FIG. 8, element 22 for example), the width of the laterally extending tongues 24 and the positions of the lugs 30 are such that the other blocking element 22,22 remains stationary (FIG. 8, element 20) and thus blocks insertion of the cartridge 1.

It will readily be seen that the blocking device according to the invention immediately impedes insertion of a cartridge which is not properly oriented when inserted by the user, and it does so at the very start of the insertion movement. Hence, the user is immediately alerted and can check the orientation of the cartridge without continuing or forcing the insertion movement, thus safeguarding not only the loading apparatus but also the cartridge itself.

By way of example for the dimensions of a preferred embodiment of the blocking device of this invention, the distance between the laterally extending tongues 24 is 65 mm; that between the lugs 30 is 2 mm; the difference in level between the lugs 30 and the tongues 24 is 5 mm; the lugs 30 are 5 mm wide and are located 15mm from the front edge of the tray 14.

What is claimed is:

1. In a loading apparatus for cartridges with a flat, rectangular casing having longitudinal edges and transverse edges, parallel top and bottom faces, and transverse-edge grooves that are asymmetrical relative to the parallel faces, the apparatus having an entrance through which a cartridge properly oriented when inserted is moved front edge first and top face up in a direction perpendicular to the front edge, an improved blocking device to insure that the cartridge is properly oriented when inserted comprising:

a pair of movable blocking elements, of opposite hand, mounted in the entrance straddling a line dividing the entrance;

each blocking element presenting (i) a stop member near the dividing line which is engaged by the front edge of the cartridge to impede its insertion and which is carried on a flexible portion of the blocking element that can flex to displace the stop member clear of the cartridge to allow insertion, (ii) a lateral surface near a side margin of the entrance which is engaged by a corner of the front edge of the cartridge to move the movable blocking element laterally away from the dividing line as the cartridge starts through the entrance, and (iii) a laterally extending tongue near the entrance side margin which enters one of the cartridge transverse-edge grooves when the cartridge is top face up when inserted; and a pair of displacement members mounted near the dividing line coacting with the blocking elements to flex the flexible portions and retract the stop members thereof responsive to lateral movement of both blocking elements produced by engagement of the lateral surfaces thereof by both corners of the front-edge of the cartridge thereby to allow the cartridge through the entrance only when the cartridge is properly oriented when inserted.

2. The improved blocking device according to claim 1 wherein the blocking elements are mirror images of each other, wherein the dividing line is a center line equally dividing the entrance, wherein the blocking elements are symmetrically mounted in the entrance adjacent the center line and wherein the blocking elements are resiliently urged toward each other.

3. The improved blocking device according to claim 1 wherein coacting edges are provided on the displacement members and the flexible portions of the blocking elements, to flex the flexible portions and retract the stop members carried thereby clear of the cartridge responsive to movement of the blocking elements away from each other.

4. The improved blocking device according to claim 1 wherein the lateral extending tongues presented by the blocking elements act as stops when the cartridge is upside down when inserted.

5. The improved blocking device according to claim 1 wherein the lateral surface presented by the blocking element is a sideways inclined vertical surface arranged to cooperate with a rounded front corner of the cartridge upon its insertion, to effect the lateral movement of the blocking element.

6. The improved blocking device according to claim 1 wherein the pair of blocking elements are elastically connected to each other.

7. The improved blocking device according to claim 1 wherein the loading apparatus is mounted to receive a cartridge inserted in a horizontal plane and the stop member presented by each blocking element is a lug which is retracted vertically to clear the cartridge.

8. The improved blocking device according to claim 7 wherein the loading apparatus includes a tray having a notch through which the lug of each blocking element passes vertically to a blocking position and is retracted vertically to clear the cartridge.

9. The improved blocking device according to claim 8 wherein the lug of each blocking element carries a horizontally extending finger that prevents vertical movement of the lug when a cartridge is oriented improperly when inserted.

10. In a loading apparatus for cartridges with a flat, rectangular casing having longer longitudinal edges than transverse edges, and parallel top and bottom faces, the apparatus having an entrance through which a cartridge when properly oriented when inserted is moved front edge first and top face up in a direction perpendicular to the front edge, an improved blocking device to insure that the cartridge is properly oriented when inserted comprising:

a pair of movable blocking elements, of opposite hand, mounted in a central portion of the entrance straddling a line dividing the entrance;

each blocking element presenting (i) a stop member near the dividing line which is engaged by the front edge of the cartridge to impede its insertion and which is carried on a flexible portion of the blocking element that can flex to displace the stop member clear of the cartridge to allow insertion and (ii) a lateral surface near a side margin of the entrance which is engaged by a corner of the front edge of the cartridge to move the movable blocking element laterally away from the other blocking element as the cartridge starts through the entrance; and displacement members mounted at the entrance coacting with the blocking elements to flex the flexible portions and retract the stop members thereof responsive to lateral movement of both blocking elements away from each other thereby to allow the cartridge through the entrance only when the cartridge is properly oriented when inserted.

11. The improved blocking device according to claim 10 wherein the blocking elements are mirror images of each other, wherein the dividing line is a center line equally dividing the entrance, wherein the blocking elements are symmetrically mounted in the entrance adjacent the center line and wherein the blocking elements are resiliently urged toward each other.

12. The improved blocking device according to claim 10 for cartridges having transverse-edge grooves that are asymmetrical relative to the parallel top and bottom faces, wherein each of the movable blocking elements presents a laterally extending tongue near the entrance side margin which enters one of the transverse-edge grooves when the cartridge is top face up when inserted and blocks the cartridge when the cartridge is inserted upside down, back-edge first, or transverse-edge first.

13. The improved blocking device according to claim 10 wherein the loading apparatus is mounted to receive a cartridge inserted in a horizontal plane, the stop member presented by each blocking element is a lug which is retracted vertically to clear the cartridge, and each lug carries a horizontally extending finger that prevents the lug from being retracted vertically when a cartridge is oriented improperly when inserted.

* * * * *